US009173808B2

(12) United States Patent
Ciechanowski et al.

(10) Patent No.: US 9,173,808 B2
(45) Date of Patent: Nov. 3, 2015

(54) AIR AND WATER MASSAGE SYSTEM FOR TUBS

(75) Inventors: Dominique Ciechanowski, Sainte-Marguerite de Dorchester (CA); Miguel Castellote, Sainte-Marguerite de Dorchester (CA)

(73) Assignee: C.G. AIR SYSTEMES INC., Sainte-Marguerite de Dorchester, Quebec (CA)

( * ) Notice: Subject to any disclaimer, the term of this patent is extended or adjusted under 35 U.S.C. 154(b) by 370 days.

(21) Appl. No.: 13/088,716

(22) Filed: Apr. 18, 2011

(65) Prior Publication Data

US 2011/0252558 A1 Oct. 20, 2011

Related U.S. Application Data

(60) Provisional application No. 61/324,885, filed on Apr. 16, 2010.

(51) Int. Cl.

| | |
|---|---|
| ***A61H 33/04*** | (2006.01) |
| ***F16K 1/00*** | (2006.01) |
| ***A61H 33/02*** | (2006.01) |
| *A61H 33/00* | (2006.01) |

(52) U.S. Cl.

CPC .............. *A61H 33/02* (2013.01); *A61H 33/027* (2013.01); *A61H 33/028* (2013.01); *A61H 33/60* (2013.01); *A61H 33/6073* (2013.01); *A61H 2033/0054* (2013.01)

(58) Field of Classification Search

CPC ...................... A61H 33/6063; A61H 33/0087
USPC ................................ 4/541.1–541.6; 137/883
See application file for complete search history.

(56) References Cited

U.S. PATENT DOCUMENTS

| | | | | |
|---|---|---|---|---|
| 3,190,310 | A * | 6/1965 | Honsinger | 137/583 |
| 5,930,851 | A * | 8/1999 | Brunelle | 4/541.1 |
| 7,503,082 | B2 * | 3/2009 | Castellote | 4/541.5 |
| 2003/0233704 | A1 * | 12/2003 | Castellote | 4/541.5 |
| 2005/0097666 | A1 * | 5/2005 | Christensen | 4/541.1 |
| 2005/0172392 | A1 * | 8/2005 | Swart et al. | 4/541.5 |
| 2007/0094784 | A1 * | 5/2007 | Tran | 4/541.5 |
| 2008/0148471 | A1 * | 6/2008 | Tatum | 4/541.6 |
| 2009/0089924 | A1 * | 4/2009 | Jan | 4/541.5 |
| 2010/0050336 | A1 * | 3/2010 | Davis | 4/541.6 |

* cited by examiner

*Primary Examiner* — Huyen Le
*Assistant Examiner* — Christine Skubinna
(74) *Attorney, Agent, or Firm* — Norton Rose Fulbright Canada LLP

(57) ABSTRACT

A gas and liquid massage system for a tub comprises jets. Each jet has a gas injector and a liquid injector. The jets concurrently inject liquid and gas. A liquid circuit feeds a flow of liquid to the liquid injectors. A gas circuit feeds a flow of gas to the gas injectors. A sequencer manifold in the gas circuit selectively closes the gas supply to some of the jets to intermittently inject gas with the injected liquid. A massage system controller operates the sequencer manifold in selectively closing the gas supply to some of the jets. A method for injecting fluids into the liquid of the tub is also provided.

6 Claims, 5 Drawing Sheets

AIR AND WATER MASSAGE SYSTEM FOR TUBS

CROSS-REFERENCE TO RELATED APPLICATION

This patent application claims priority on U.S. Provisional Application No. 61/324,885, filed on Apr. 16, 2010 and incorporates by reference U.S. patent application Ser. No. 12/502,621 filed Jul. 14, 2009 and published on Jan. 14, 2010 under number US2010/0006158 A1.

FIELD OF THE APPLICATION

The present application relates to jet massage systems used in tubs, such as bathtubs, hot tubs, whirlpools and similar basins, and more particularly to a jet for the injection of air and water into the liquid of such tubs to procure a massaging effect for the occupant of the tub.

BACKGROUND OF THE ART

Tubs are well known for their primary use, namely a washroom installation in which a user person washes/bathes. Tubs have, however, evolved to add pleasure and comfort to practicality, and are found in many forms, such as bathtubs, spas and whirlpools. For instance, tubs are now provided with air-jet systems and whirlpool systems.

Massage systems of various configurations have been provided to inject fluids, such as air or water, into the liquid of the tub, so as to procure a massaging effect for the occupant of the tub. One known massage system combines the injection of air and water to provide a different sensorial experience to the bather. The known massage system comprises water jets equipped with venturi devices whereby air is sucked by the flow of water directed to the tub. Accordingly, the resulting flow of water in the tub comprises air bubbles, thereby causing a different sensation on the skin of the bather.

Despite creating a different massaging effect due to the combination of air and water in the jets, there remains a need to perform additional effects to provide different types of treatment with air/water massage systems.

SUMMARY OF THE APPLICATION

Therefore, in accordance with the present application, there is provided a gas and liquid massage system for a tub, comprising: a plurality of jets each having a gas injector and a liquid injector for injecting concurrently liquid and gas; a liquid circuit for feeding a flow of liquid to the liquid injectors of the jets; a gas circuit for feeding a flow of gas to the gas injectors of the jets; a sequencer manifold in the gas circuit for selectively closing a gas supply to some of the jets to intermittently inject gas with the injected liquid; and a massage system controller for operating the sequencer manifold in selectively closing the gas supply to some of the jets.

Further in accordance with the present application, there is provided a method for injecting fluids in the liquid of a tub of the type having a plurality of jets each having a gas injector and a liquid injector, comprising: supplying pressurized liquid to the liquid injector of each said jet; and simultaneously supplying pressurized gas to the gas injector of only a portion of the jets; whereby gas and liquid exit the jet concurrently into the liquid of the tub.

DESCRIPTION OF THE PREFERRED EMBODIMENTS

Figure 1:
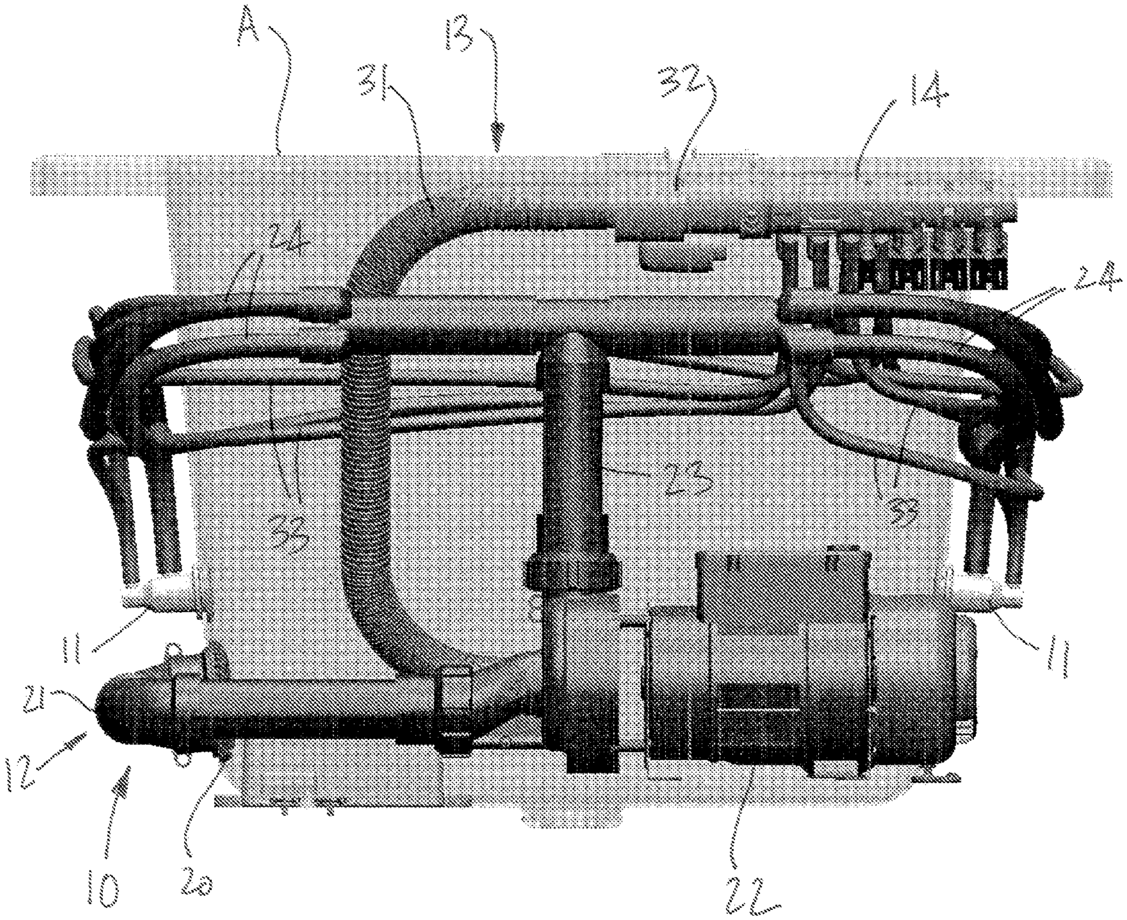
FIG. 1 is an end elevation view of an air and water massage system in accordance with an embodiment of the present disclosure, as mounted to a hidden surface of a tub.
Figure 2:
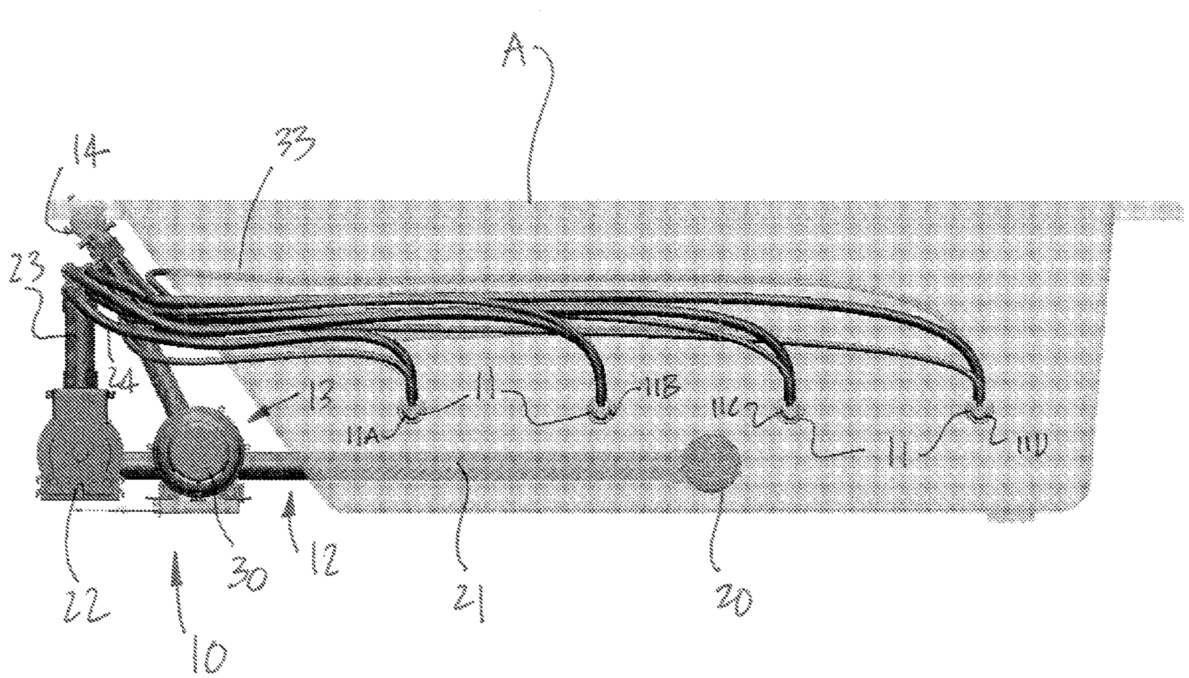
FIG. 2 is a side elevation view of the tub with the air and water massage system of FIG. 1.

Referring to the drawings and more particularly to FIGS. 1 and 2, there is shown an air and water massage system 10 as mounted to a tub A. A majority of the components of the massage system 10 are mounted adjacent to the hidden surface of the tub A and are thus not visible to an observer/user of the tub A as many of these components are built-in under the tub. As will be described hereinafter, some components of the air and water massage system 10 are visible to an observer/user of the tub.

The air and water massage system 10 of the present disclosure uses fluid jets 11 that inject coincidentally and simultaneously a liquid and a gas, such as water and air, or any other appropriate fluids. Accordingly, a flow of mixed air and water is injected by each single fluid jet 11. For instance, the fluid jet 11 is as described in U.S. Patent Application Publication Serial No. 2010/0006158, incorporated herewith by reference. Other types of appropriate fluid jets may be used as well.

In order to supply both water and air to the fluid jet 11, the air and water massage system 10 has a water circuit 12 and an air circuit 13. The water circuit 12 and the air circuit 13 may be operated independently one from the other, as each one has its own pressure source, as will be described hereinafter. A sequencer manifold 14 is in the air circuit 13 and is used to cause a massaging effect specific to the air and water massage system 10 of the present disclosure.

Still referring to FIGS. 1 and 2, the water circuit 12 is shown having an inlet 20 in a bottom of a side wall of the tub. The inlet 20 therefore collects water that is in the tub. As illustrated in FIGS. 1 and 2, there may be provided a screen in the inlet 20 so as to ensure that no solid components are sucked into the water circuit 12 and to prevent any incident with body parts. It is pointed out that the water circuit 12 may have other sources of liquids than the tub A. Moreover, the inlet 20 may be located at other positions in the tub A.

A collector pipe 21 is in fluid communication with the inlet 20, and extends to a pump 22. The pump 22 therefore increases the velocity and pressure of the water so as to subsequently inject the water into the tub in the form of a massaging stream, via the fluid jets 11.

The pump 22 may be any appropriate type of pump. In the illustrated example, the water side of the pump 22 features a central inlet and radial outlet operated by a motor physically separated from the water side of the pump 22. A manifold 23 is connected to the outlet of the pump 22. The manifold 23 has a T-shaped body with a plurality of outlets for water distribution pipes 24. Each of the water distribution pipes 24 is connected to a respective fluid jet 11 for the injection of water therethrough.

Therefore, once actuated, the pump 22 sucks water into the inlet 20 and pressures the water from the collector pipe 21 through the pump 22 into the manifold 23 and ultimately to the water distribution pipes 24 to reach the fluid jets 11 for the injection in the water of the tub A. Any other appropriate circuit can be used as well for the injection of water into the tub A. It is considered to relate the water circuit 12 to a water sensor in the tub A. According to an embodiment, the water sensor is used to prevent operation of the pump 22 in the absence of water in the tub A, for instance to prevent cavitation and/or overheating of the pump 22.

Still referring to FIGS. 1 and 2, the air circuit 13 has a blower 30. A blower pipe 31 is connected to an outlet of the blower 30. In the illustrated embodiment, the blower pipe 31 is a flexible pipe, and is oriented upwardly so as to form a Hartford loop. A safety valve unit 32 may be provided in the blower pipe 31. The safety valve unit 32 may be of the type described as the manifold in U.S. Pat. No. 7,503,082. Accordingly, by using such a safety valve unit 32, any water that may reach the blower pipe 31 is exhausted when the blower 30 is not in operation, by way of a movement of a ball 32A. Moreover, the check valve mechanism 32B inside the safety valve unit 32 has another level of protection against water infiltration. Moreover, the pressure-exhaust embodiment of U.S. Pat. No. 7,503,082 may also be used to avoid a pressure surge in the air circuit 13. Although not shown, a heating element may be positioned in the blower pipe 31, or may be a part of the blower 30. The heating element is used to provide warmed up air to the air circuit 13. Moreover, the speed of the blower 30 may be varied by the user using the appropriate interface to vary the pressure of the gas being injected.

Figure 3:
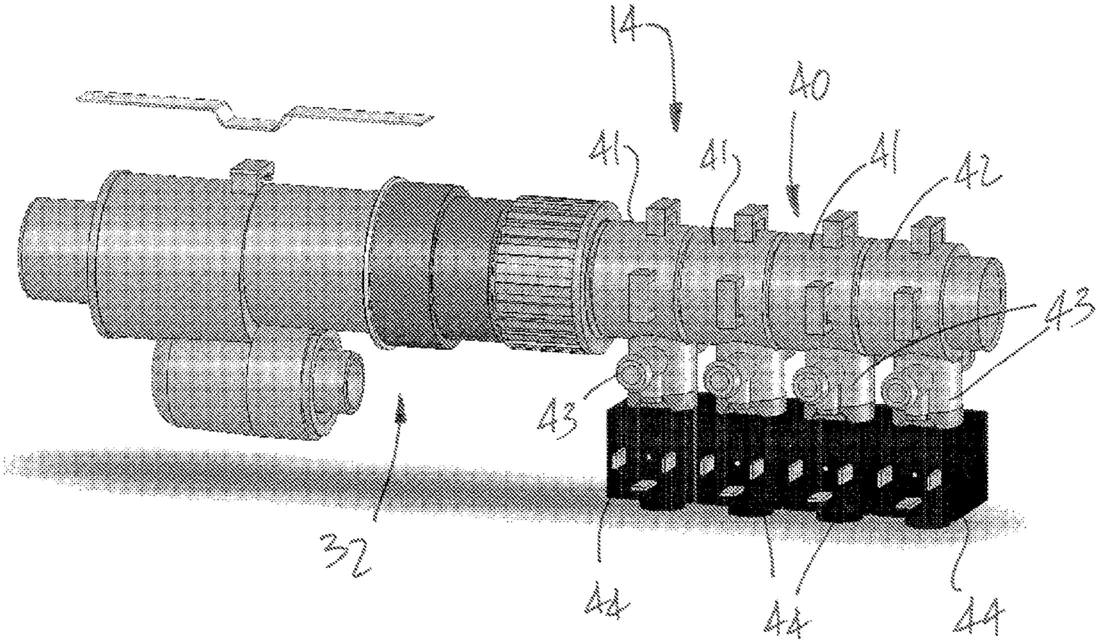
FIG. 3 is a perspective view of a sequencer manifold with safety valve unit as used in the air and water massage system of FIG. 1.
Figure 4:
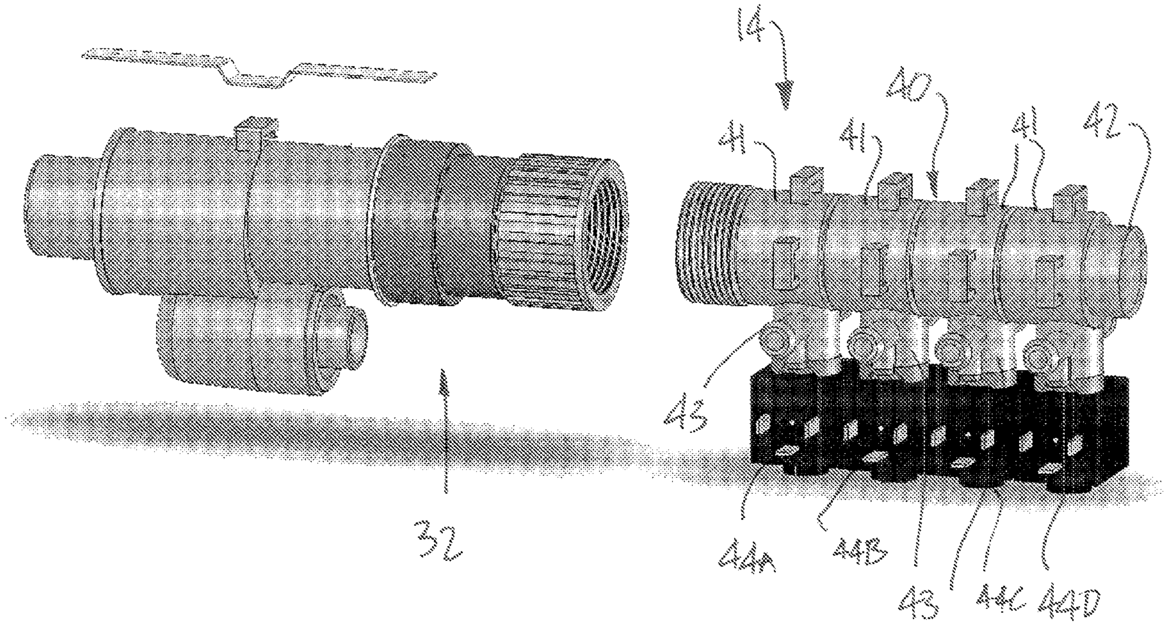
FIG. 4 is an assembly view of the sequencer manifold and safety valve unit of FIG. 3.

The sequencer manifold 14 is connected to the safety valve unit 32. As shown in FIGS. 3 and 4, the sequencer manifold 14 may be screwed to an end of the safety valve unit 32, via threading at its connection end. Air distribution pipes 33 (FIGS. 1 and 2) are connected to the various ports of the sequencer manifold 14 and thus relate the sequencer manifold 14 to the fluid jets 11. During operation, the blower 30 creates a flow of air in the blower pipe 31. The flow of air will pass through the safety valve unit 32 to the sequencer manifold 14. According to the operation of the sequencer manifold 14, the flow of air will reach the air distribution pipes 33 in any appropriate sequence to then reach the fluid jets 11 for the coincidental injection of water and air into the tub via the fluid jets 11.

Figure 5:
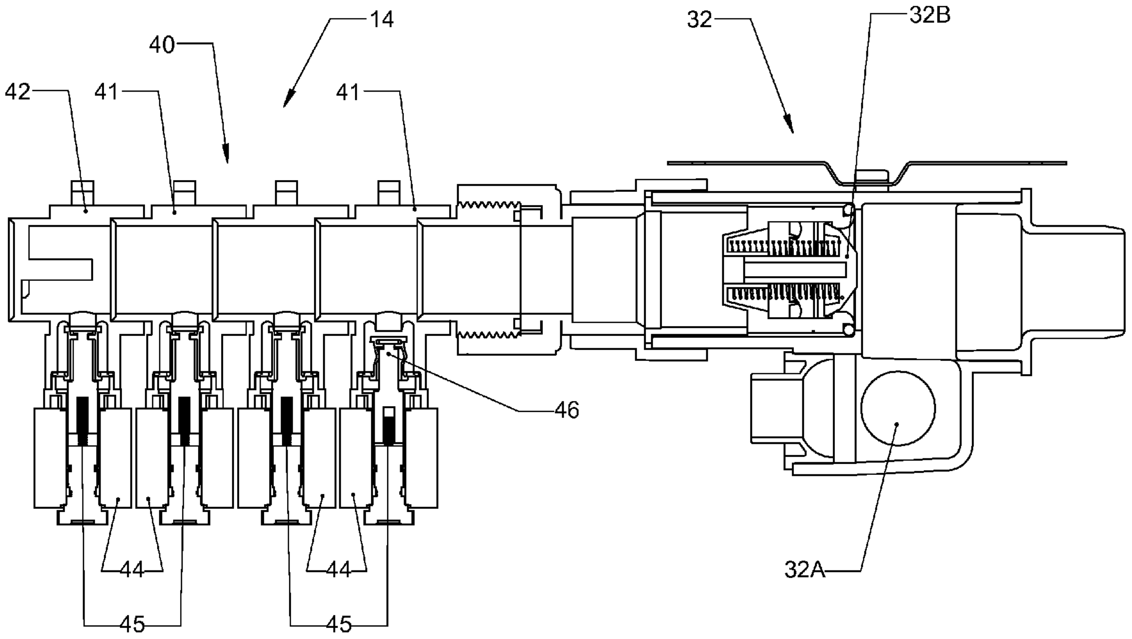
FIG. 5 is a sectional view of the sequencer manifold and safety valve unit of FIG. 3.

Referring concurrently to FIGS. 3 to 5, the sequencer manifold 14 is shown having a cylindrical body 40. In an embodiment, the cylindrical body 40 is constituted of a plurality of cylindrical segments 41 positioned end to end with a plugged segment 42 at the free end of the cylindrical body 40. The sequencer manifold 14 of FIG. 5 has four of the segments 41/42 but may have more or less of these segments 41/42. One of the segments 41 may be provided with threading for connection with the safety valve unit 32. It is pointed out that the segments 41 may initially be plugged, but pierced by the assembly of plugs 42 end to end. Alternatively, the cylindrical body 40 may be an integral piece.

Outlet tees 43 (i.e., tee fitting, tees, etc) have a central portion projecting radially from the cylindrical body 40. The outlet tees 43 have nipples to which the air distribution pipes 33 will be connected in fluid communication. Accordingly, the outlet tees 43 interface the sequencer manifold 14 to the distribution pipes 33. In an embodiment, the distribution pipes 33 related to a same outlet tee 43 are connected to fluid jets 11 on opposite sides of the tub A, for instance in a mirror image arrangement of the pairs of the fluid jets 11. The nipples of the tees may have wedge connectors, tubing connectors, or the like. Electrical valves (i.e., electrovalves) are connected to each of the outlet tees 43. Any appropriate fixation configuration may be used to connect the electronic valves 44 to the outlet tees 43. In a specific embodiment, electromagnets of the valves 44 will actuate the movement of a piston 45. The piston 45 are typically spring-loaded pistons that are in a normally-closed (NC) position so as to prevent air to pass therethrough. Upon actuation of the valves 44, the pistons 45 will move to an open position so as to allow air to pass therethrough from an inner cavity of the cylindrical body 40. In that manner, air can reach the air distribution pipes 33 according to the actuation sequence of the valves 44. It is pointed out that other types of outlets may be used as alternatives to an outlet tee. For instance an outlet elbow, or a straight nipple could be used (e.g., a single distribution pipe per outlet of the sequencer manifold 14). As shown in FIG. 5, a cap 46 may be provided integral with each piston 45. The cap is a rubber or polymer member that closes or opens the passage in the outlet tees 43, and simultaneously seals the piston 45, so as to ensure the proper sealing and operation of the valve 44 and outlet tee 43, by being an interface between the piston 45 and a plastic/rubber seat therefor.

Although the valves 44 are described as being in a normally-closed position until actuated, it is considered to have the valves be of the normally-open type. In such a case, air flows freely to the fluid jets 11 when the blower 30 is actuated.

The sequencer manifold 14 in operation dynamically changes the number of air distribution pipes operating simultaneously. Therefore, it is possible to increase the air pressure at some of the fluid jets 11 by blocking the air flow of the other fluid jets with the sequencer manifold 14. It is thus possible to increase the pressure at some fluid jets 11 without increasing the size, capacity, capability of the blower 30.

Therefore, the air and water massage system 10 of the present application creates a novel massaging effect. More specifically, a current stream of water is injected into the water of tub via the water circuit 12 and fluid jets 11. The bather is therefore subjected to a continuous massaging effect from the water. The sequencer manifold 14 is operated so as to periodically inject air through the fluid jets 11 according to various injection patterns. Therefore, at selected occasions, the fluid jets will coincidentally inject water and air. This increases the massaging effect intermittently at certain locations and therefore causes another dimension of massaging.

In FIG. 4, the valves 44 are labeled as 44A-44D to illustrate various modes of operation, and are connected to fluid jets 11A-11D (FIG. 1), with corresponding affixed letters identifying sets of a corresponding valve and fluid jet(s). In a wave operation, valves 44A-44D are opened and closed in the following sequence: 44A, 44B, 44C, 44D, 44A, etc., with the valves 44 being associated with an arrangement of fluid jets 11 positioned in the tub A sequentially (as shown in FIG. 1). In a back-and-forth operation, valves 44A-44D are opened and closed in the following sequence: 44A, 44B, 44C, 44D, 44C, 44B, 44A, 44B, etc. In a pulse mode, the valves 44 are opened and closed for specific amounts of time, to create a pulse effect.

The time period between opening and closing of each valve 44 may also be adjusted by the user of the system. According to another embodiment, the valves 44A-44D may open automatically when the air circuit 13 is turned on, to avoid a pressure overload in the air circuit 13. Once a mode of operation is selected, some of the valves 44A-44D are closed.

It is also considered to provide the water circuit with a sequencer manifold 14, provided all safety precautions are taken, in terms of shock hazards.

The air/massage system 10 is provided with a controller and appropriate interface. The air/massage system 10 may therefore be operated in different modes. According to a mode, the sequencer manifold 14 has all valves 44 open, whereby all fluid jets 11 in operation with air and water. According to another mode, the sequencer manifold 14 opens and closes specific groups of valves 44 sequentially. This causes a continuous water massage, but intermittent air massage, in terms of space, and thus a sensation of movement in the massaging effect. According to another mode, the sequencer manifold 14 keeps specific valves 44 open. For instance, it may be desired to perform the air and water massaging only in the feet area of the tub A. All of these modes may be selected by the user of the tub A.

In order to reduce energy consumption by the valves 44 and to control the massaging effect in each set of fluid jets 11, it is considered to pulse the valves 44 to the open position (or alternatively to the closed position). A controlled modulation (e.g., as pulse-width, bit-angle modulation) of the pistons 45 may not affect the massaging effect as felt by the user in the tub A, or may affect the intensity (e.g., amplitude) and frequency of the massaging effect, for each outlet-tee pair of fluid jets 11 independently (in the case of outlet tees 43). The pulsating effect on the pistons 45 of the valves 44 in the controlled modulation will not be directly felt by the user, but an overall massaging effect will be modified by the controlled modulation.

The invention claimed is:

1. A gas and liquid massage system for a tub, comprising:

a plurality of jets each having a gas injector and a liquid injector for injecting concurrently liquid and gas, the plurality of jets separated in at least two groups of jets;

a liquid circuit for feeding a flow of liquid to the liquid injectors of the jets;

a gas circuit for feeding a flow of gas to the gas injectors of the jets;

a sequencer manifold in the gas circuit having an inlet with a plurality of outlets, the sequencer manifold having a tubular body having a longitudinal dimension with the inlet at an end and made of segments interconnected end to end, at least two of the segments having at least one of the outlets such that the outlets are distributed along the longitudinal dimension, an individual electrovalve associated to each one of the outlets for selectively blocking with a spring-loaded piston a gas supply to the gas injector of the jets to intermittently inject gas with the injected liquid through only some of the jets, each one of said outlets of the sequencer manifold having its own one of said individual electrovalve; and a massage system controller for operating the gas and liquid massage system by controlling the sequencer manifold in selectively actuating the electrovalves to provide a gas supply to only some of the jets of the sequencer manifold, the massage system controller operating a mode sequencing comprising:

continuously operating the liquid circuit for the injection of liquid through all of the jets;

concurrently operating the gas circuit while:

automatically opening the electrovalves related to a first of the groups of jets while the electrovalves related to at least a second of the groups of jets are automatically closed to provide the gas supply to the first of the groups only while liquid is injected through all of the groups; and automatically opening the electrovalves related to the second of the groups of jets while the electrovalves related to the first of the groups of jets are automatically closed to provide the gas supply to the second of the groups only while liquid is injected through all of the groups.

2. The gas and liquid massage system according to claim 1, wherein the sequencer manifold has a tubular body with the inlet in fluid communication with a blower, and the plurality of outlets, the gas circuit comprising pipes receiving the flow of gas from the outlets to feed the gas injectors.

3. The gas and liquid massage system according to claim 2, wherein a tee fitting is positioned at each of the outlets to feed a pair of the gas injectors from a common outlet, each of the pair representing one said group.

4. The gas and liquid massage system according to claim 3, wherein a single valve is associated with each of the tee fittings to close the gas supply to each said groups of pairs of the jets simultaneously.

5. The gas and liquid massage system according to claim 4, wherein said groups of the pairs of the gas injectors are positioned on opposite sides of the tub.

6. The gas and liquid massage system according to claim 2, further comprising a check valve and a pressure relief valve between the blower of the gas circuit and the sequencer manifold.

* * * * *